(12) United States Patent
Kuroda (10) Patent No.: US 10,599,062 B2
(45) Date of Patent: Mar. 24, 2020

(54) CHARGING MEMBER

(71) Applicant: HEWLETT-PACKARD DEVELOPMENT COMPANY, L.P., Spring, TX (US)

(72) Inventor: Noriaki Kuroda, Yokohama (JP)

(73) Assignee: HEWLETT-PACKARD DEVELOPMENT COMPANY L.P., Spring, TX (US)

(*) Notice: Subject to any disclaimer, the term of this patent is extended or adjusted under 35 U.S.C. 154(b) by 0 days.

(21) Appl. No.: 16/418,490

(22) Filed: May 21, 2019

(65) Prior Publication Data

US 2019/0271931 A1  Sep. 5, 2019

Related U.S. Application Data

(63) Continuation of application No. PCT/JP2017/019760, filed on May 26, 2017.

(30) Foreign Application Priority Data

Nov. 22, 2016 (JP) ................. 2016-227058

(51) Int. Cl.
| | |
|---|---|
| G03G 15/02 | (2006.01) |
| B29C 35/02 | (2006.01) |
| B32B 15/06 | (2006.01) |
| B32B 25/14 | (2006.01) |
| F16C 13/00 | (2006.01) |
| G03G 9/08 | (2006.01) |

(52) U.S. Cl.
CPC ......... *G03G 15/0233* (2013.01); *B29C 35/02* (2013.01); *B32B 15/06* (2013.01); *B32B 25/14* (2013.01); *F16C 13/00* (2013.01); *G03G 9/08* (2013.01)

(58) Field of Classification Search
CPC .................................................. G03G 15/0233
See application file for complete search history.

(56) References Cited

U.S. PATENT DOCUMENTS

| | | | | |
|---|---|---|---|---|
| 2008/0193172 A1* | 8/2008 | Kusaba | ............... | G03G 15/0818 |
| | | | | 399/286 |
| 2010/0046987 A1* | 2/2010 | Kato | ................... | G03G 15/0233 |
| | | | | 399/176 |
| 2014/0334843 A1* | 11/2014 | Taniguchi | .......... | G03G 15/0233 |
| | | | | 399/111 |
| 2015/0003874 A1* | 1/2015 | Aoyama | ............ | G03G 15/0233 |
| | | | | 399/176 |

(Continued)

FOREIGN PATENT DOCUMENTS

| | | |
|---|---|---|
| JP | 2003316111 | 11/2003 |
| JP | 2005024674 | 1/2005 |

(Continued)

*Primary Examiner* — Carla J Therrien
(74) *Attorney, Agent, or Firm* — Staas & Halsey LLP (57) ABSTRACT

An example charging member includes a conductive support, a conductive elastic body layer laminated on the conductive support, and a conductive resin layer laminated as an outermost layer on the conductive elastic body layer. The conductive resin layer may contain a matrix material and resin particles. The conductive resin layer may have an arithmetic average roughness Ra of 2.0 to 7.0 μm, a 10-point average roughness Rzjis of 15 to 40 μm, and a skewness Rsk of 0.5 to 2.5.

15 Claims, 3 Drawing Sheets

(56) References Cited

U.S. PATENT DOCUMENTS

2015/0153676 A1* 6/2015 Masuyama ............. B29C 43/36
                                                                             264/241
2016/0238961 A1* 8/2016 Takagami ........... G03G 15/0266
2016/0266511 A1* 9/2016 Kuroda .............. G03G 15/0233

FOREIGN PATENT DOCUMENTS

| JP | 2008112150 | 5/2008 |
| JP | 2010231078 | 10/2010 |
| JP | 2012168259 | 9/2012 |
| JP | 5206935 | 3/2013 |
| JP | 5455336 | 1/2014 |
| JP | 2014167615 | 9/2014 |
| JP | 2015043059 | 3/2015 |
| JP | 2015121769 | 7/2015 |
| WO | WO-2014207876 | 12/2014 |

* cited by examiner

CHARGING MEMBER

CROSS-REFERENCE TO RELATED APPLICATIONS

This application is a continuation application of PCT International Patent Application No. PCT/JP2017/019760, filed May 26, 2017, which claims priority from Japanese Patent Application No. 2016-227058, filed on Nov. 22, 2016, the disclosures of each of the foregoing is incorporated herein by reference.

BACKGROUND

Some copying machines, printers, or the like, may include a charging member for charging a latent image holding body such as a photosensitive body which is used for an electrostatic latent image process.

DETAILED DESCRIPTION

In an "AC charging mode", a contact charging member is subjected to a voltage resulting from superimposition of an alternating current voltage component (AC voltage component) on a direct current voltage component is applied to a contact charging member. The "AC charging mode" may be used in order to improve charging uniformity.

The "AC charging mode" may be used in order to improve charging uniformity. For superimposing a high-voltage alternating current voltage having an inter-peak voltage which is at least 2 times higher than a discharge start voltage (Vth) upon application of direct current voltage, an alternating current power source is used in addition to a direct current power source, which may increase the cost of the charging member or imaging apparatus.

Moreover, close discharges occurring in large amounts between a charging roller and a photosensitive body, may reduce the durability of the charging roller and/or the photosensitive body, and cause the photosensitive body to wear out more easily.

To avoid the AC charging mode, the charging may be carried out by applying direct current voltage exclusively, on the charging roller. To improve the charging characteristics of a charging member which is used for carrying out the charging with application of direct current voltage exclusively, various examinations have been made from the viewpoint of surface properties of a charging member.

In order to obtain charging uniformity that is stable over a longer period time and an improved dot uniformity, even under application of direct current voltage exclusively, an example charging member may have an outermost layer with improved surface properties.

An example charging member includes a conductive support, a conductive elastic body layer laminated on the conductive support, and a conductive resin layer laminated as the outermost layer on the conductive elastic body layer, in which the conductive resin layer contains a matrix material and resin particles, and an arithmetic average roughness Ra, a 10-point average roughness Rzjis, and a skewness Rsk of the conductive resin layer satisfy the following formulae, respectively:

$$2.0 \leq Ra\ [\mu m] \leq 7.0$$

$$15 \leq Rzjis\ [\mu m] \leq 40$$

$$0.5 \leq Rsk \leq 2.5$$

In some examples, the resin particles may contain a first particle and a second particle, wherein an average particle diameter $B_1$ of the first particle and an average particle diameter $B_2$ of the second particle satisfy the following formulae, respectively, in order to improve stability of charging characteristics and dot uniformity:

$$20 \leq B_1\ [\mu m] \leq 40$$

$$10 \leq B_1 - B_2\ [\mu m]$$

In some examples, a layer thickness A of a part of the conductive resin layer constituted exclusively of the matrix material may satisfy the following formula, in order to improve stability of charging characteristics and dot uniformity:

$$1.0 \leq A\ [\mu m] \leq 7.0$$

In some examples, an inter-particle distance RSm of the resin particles in the conductive resin layer may satisfy the following formula, in order to improve stability of charging characteristics and dot uniformity:

$$50 \leq RSm\ [\mu m] \leq 250$$

In some examples, the arithmetic average roughness Ra in the conductive resin layer may satisfy the following formula, in order to improve stability of charging characteristics and dot uniformity:

$$2.5 \leq Ra\ [\mu m] < 7.0$$

In some examples, the 10-point average roughness Rzjis in the conductive resin layer may satisfy the following formula, in order to improve stability of charging characteristics and dot uniformity:

$$20 \geq Rzjis\ [\mu m] \leq 35$$

In some examples, the skewness Rsk in the conductive resin layer may satisfy the following formula, in order to improve stability of charging characteristics and dot uniformity:

$$0.8 \leq Rsk \leq 2.0$$

In some examples, the resin particles may include insulating particles, in order to improve stability of charging characteristics and dot uniformity.

In some examples, the content of the resin particles may be 5 to 80 parts by mass relative to 100 parts by mass of the matrix material, in order to improve stability of charging characteristics and dot uniformity.

In some examples, the resin particles may include amorphous particles, which have favorable affinity for the matrix material and an increased adhesion strength at an interface between the matrix material and the resin particles, in order to improve the durability.

In some examples, the resin particles may include nylon resin particles, which have a favorable affinity for the matrix material and an increased adhesion strength at an interface between the matrix material and the resin particles, in order to improve the durability.

In some examples, the matrix material may contain at least one resin selected from the group consisting of a nylon resin and a polyurethane resin, which have favorable affinity for the resin particles and an increased adhesion strength at an interface between the matrix material and the resin particles, in order to improve the durability.

In some examples, the conductive elastic body layer may contain epichlorohydrin rubber, in order to reduce effects caused by resistance variation during production, and thus improve the productivity, and in order to improve the adhesion strength between the conductive elastic body layer and the conductive resin layer.

In some examples, the charging member is applied with (or charged with, or subjected to) direct current voltage exclusively.

In the following description, with reference to the drawings, the same reference numbers are assigned to the same components or to similar components having the same function, and overlapping description is omitted.

Example charging members may have an improved surface shape, in order to improve dot uniformity on a photosensitive body and obtain a charging uniformity that is stable over a longer period of time and a higher image quality. For example, a skewness (Rsk) of the surface of the charging member may be controlled in order to improve the uniformity of discharge characteristics, in the discharging to the photosensitive body. The skewness Rsk of a surface is a parameter related to tribology (friction) that represents a cubic mean of $Z(x)$ in a standard length that is made dimensionless by cube of the root mean square height (Zq).

Charging Member

Figure 1:
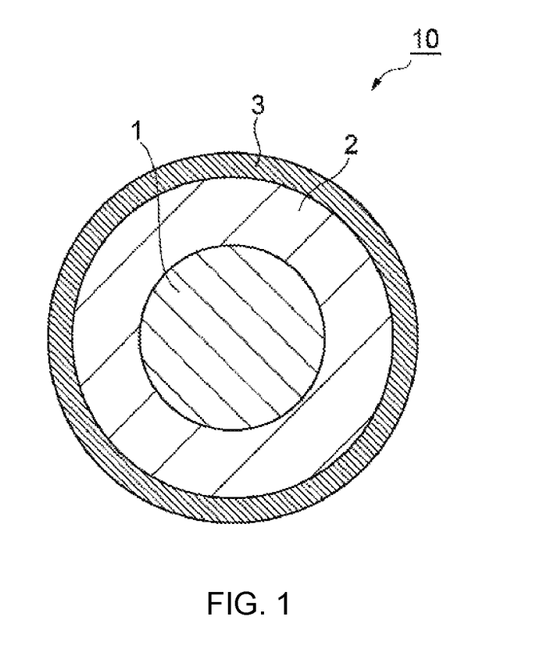
FIG. 1 is a schematic cross-sectional view of an example charging member.

With reference FIG. 1, an example charging member 10 may include a conductive support 1, a conductive elastic body layer 2 laminated on the conductive support 1, and a conductive resin layer 3 laminated on the conductive elastic body layer 2. The conductive resin layer 3 may form an outermost layer of the example charging member 10.

In some examples, the conductive elastic body layer 2 and the conductive resin layer 3 may be integrally laminated according to an order going from an inner portion to an outer portion in a roller diameter direction (e.g., in a radial direction), on an outer peripheral surface of the conductive support (axial body) 1.

In some examples, an intermediate layer such as a resistance adjusting layer, for example, to increase the voltage resistance (leak resistance) may be interposed between the conductive elastic body layer 2 and the conductive resin layer 3.

In some example image forming devices, the charging member may be formed as a charging means for a charged body or body to be charged, for example the charging member may provide an even charging treatment of a surface of a photosensitive body, which is an image carrier.

Conductive Support

In some examples, the conductive support may be made of metal having conductivity, and a metallic hollow body (pipe shape) or center-filled body (rod shape) formed of iron, copper, aluminum, nickel, stainless, or the like is used, for example.

In some examples, an outer peripheral surface of the conductive support may have been treated, to the extent that the conductivity is not impaired, by plating for providing corrosion resistance or scratch resistance. The outer peripheral surface of the conductive support may be coated with an adhesive, a primer, or the like to enhance the adhesiveness to the conductive elastic body layer. In that case, to ensure the sufficient conductivity, the adhesive, primer, or the like may be prepared to be electrically conductive.

The conductive support may have a substantially cylindrical shape having a diameter of 5 to 10 mm and a length of 250 to 360 mm, for example.

Conductive Elastic Body Layer

The conductive elastic body layer may have an elasticity that is suitable to ensure a uniform adhesion property to a photosensitive body. The conductive elastic body layer may have a base polymer that includes a natural rubber; a synthetic rubber such as ethylene-propylene-diene rubber (EPDM), styrene-butadiene rubber (SBR), silicone rubber, polyurethane-based elastomer, epichlorohydrin rubber, isoprene rubber (IR), butadiene rubber (BR), acrylonitrile-butadiene rubber (NBR), hydrogenated NBR (H-NBR), or chloroprene rubber (CR); a synthetic resin such as polyamide resin, polyurethane resin, or silicone resin; or any combination thereof. The base polymer may include one of the above mentioned types of material (e.g., a natural rubber or a synthetic rubber or a synthetic resin), or two or more types of material combined together.

In order to improve the characteristics of the conductive elastic body layer, the base polymer may be suitably blended with an additive such as a conductive agent, a vulcanization agent, a vulcanization promoting agent, a lubricating agent, or an aid. In some examples, the conductive elastic body layer may contain epichlorohydrin rubber as a main component, to provide a more stable resistance. In some examples, the conductive elastic body layer may contain epichlorohydrin rubber at 50% by mass or more, and in some examples the conductive elastic body layer may contain epichlorohydrin rubber at 80% by mass or more.

In some examples, the conductive agent may include carbon black, graphite, potassium titanate, iron oxide, conductive titanium oxide ($c-TiO_2$), conductive zinc oxide (c-ZnO), conductive tin oxide ($c-SnO_2$), quaternary ammonium salt, or the like. In some examples, the vulcanization agent may include sulfur or the like. In some examples, the vulcanization promoting agent may include tetramethyl thiuram disulfide (CZ) or the like. In some examples, the lubricating agent may include stearic acid or the like. In some examples, the aid may include zinc oxide (ZnO) or the like.

In some examples, the thickness of the conductive elastic body layer may be approximately 1.25 to 3.00 mm to exhibit suitable elasticity.

Conductive Resin Layer

Figure 2:
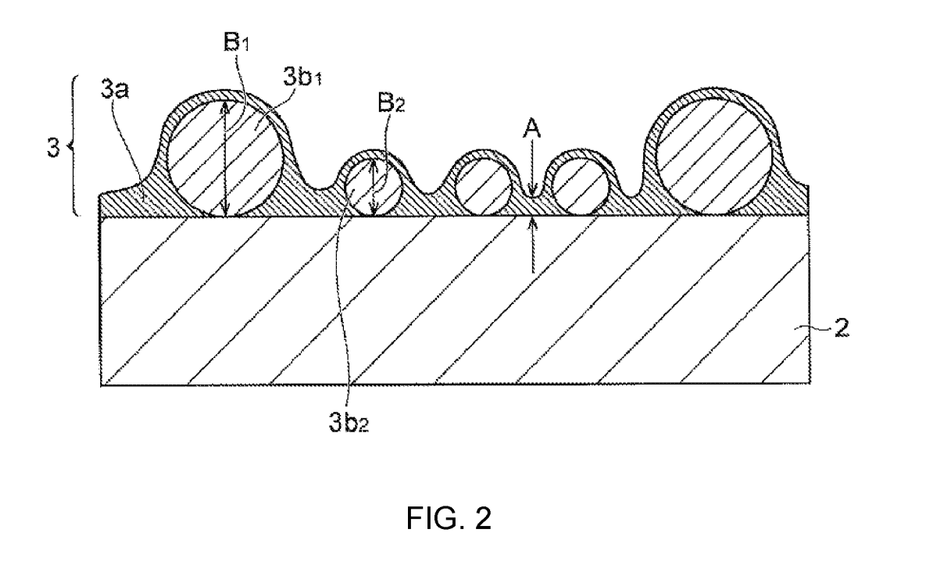
FIG. 2 is a schematic cross-sectional view illustrating an enlarged surface portion of a conductive resin layer of an example charging member.

The conductive resin layer may contain a matrix material and resin particles. In some examples, the resin particles contain a first particle and a second particle. FIG. 2 is a schematic cross-sectional view illustrating an enlarged surface of the conductive resin layer of the example charging member. With reference to FIG. 2, the conductive resin layer 3 may have a material (matrix material) 3a constituting the matrix, and a plurality of first particle $3b_1$ and of second particle $3b_2$ which are dispersed in the same material.

In some examples, the matrix material has a composition to avoid contaminating the photosensitive body as a charged body or body to be charged. The matrix material may include a base polymer such as a fluoro resin, a polyamide resin, an acrylic resin, a nylon resin, a polyurethane resin, a silicone resin, a butyral resin, a styrene-ethylene butylene-olefin copolymer (SEBC), and/or an olefin-ethylene butylene-olefin copolymer (CEBC). The types of materials for the base polymer may be used separately, or two or more types of the materials may be used together. In some examples, the matrix material includes at least one material selected from the group consisting of a fluoro resin, an acrylic resin, a nylon resin, a polyurethane resin, and a silicone resin, in order to improve the handling property (easier handling) and the degree of freedom for designing materials. In some examples, the matrix material includes at least one material selected from the group consisting of a nylon resin and a polyurethane resin.

In some examples, the thickness of the conductive resin layer, for example a layer thickness A (thickness of layer) of a part formed exclusively of the matrix material, is 1.0 to 7.0 μm ("A" part in FIG. 2). The thickness of the conductive resin layer may indicate the thickness of a middle point between particles (e.g. the resin particles) that are closest to each other. A layer thickness A of 1.0 μm or more promotes maintaining the resin particles to be added without any loss for a longer period of time. A layer thickness A of 7.0 μm or less, promotes maintaining an improved charging performance. In some examples, the thickness of the conductive resin layer may be 1.0 to 5.0 μm, and or 2.0 to 4.0 μm in some examples. The thickness of the conductive resin layer may be measured by cutting a roller cross-section with a sharp blade cutter and observing the cross-section using an optical microscope or an electron microscope.

In some examples, the resin particles form irregularities on a surface of the conductive resin layer to provide sufficient discharging points. The resin particles may include a urethane resin, a polyamide resin, a fluoro resin, a nylon resin, an acrylic resin, a urea resin, or the like material, either separately or in combination. For example, the resin particle may include one of the types of materials, or two or more types of the material may be combined together. In some examples, the resin particles include at least one selected from the group consisting of nylon resin particles, acrylic resin particles, and polyamide resin particles, in order to improve the compatibility with a matrix material, property of maintaining dispersion after addition of particles, stability after preparation into a coating material (pot life), or the like. In some examples, the resin particles include nylon resin particles. In some examples, the resin particles are insulating particles.

The resin particles may be shaped to form irregularities on a surface of the conductive resin layer. For example, the resin particles may have a sphere shape, an elliptical sphere shape, an amorphous shape, or the like. In some examples, the resin particles may be amorphous to suppress loss of the resin particles.

In some examples, the first particle $3b_1$ has an average particle diameter $B_1$ of 20 to 40 μm, to suppress charging non-uniformity. In some examples, the first particle $3b_1$ has an average particle diameter of 25 to 35 μm, to suppress charging non-uniformity. In some examples, the difference between average particle diameter $B_1$ of the first particle $3b_1$ and average particle diameter $B_2$ of the second particle $3b_2$, represented by $B_1-B_2$, is 10 μm or more, in order to suppress charging non-uniformity. In some examples, the difference $B_1-B_2$ is 12 μm or more, or 15 μm or more in other examples, in order to suppress charging non-uniformity. In some examples, an upper limit of the difference $B_1-B_2$ it may be set at 35 μm or less, in order to improve a potential difference at discharging at the tip of each particle.

The average particle diameter of a particle can be obtained by arbitrarily extracting, based on SEM observation, one hundred particles from a population of a plurality of particles and obtaining an average value of particle diameter of the extracted particles. In a case in which the particle shape is not a true sphere shape and the particle diameter is not evenly set such as an elliptical sphere shape (sphere with elliptical cross-section) or an amorphous shape, an average value of the longest diameter and the shortest diameter may be used as a particle diameter of the particle, for example.

The inter-particle distance RSm of the resin particles (e.g., inter-particle distance of whole resin particles including the first particle and the second particle) may be 50 to 250 μm. An inter-particle distance is 50 μm or more may suppress surface roughness of the conductive resin layer and particle loss. An inter-particle distance is 250 μm or less may suppress the particle loss. Accordingly, in some examples, the inter-particle distance is 80 to 200 μm, or 100 to 180 μm in other examples. The inter-particle distance may be measured on the basis of JIS B0601-2001.

In some examples, the ratio between the layer thickness A [μm] of the conductive resin layer and the average particle diameter $B_1$ [μm] of the first particle, represented by $B_1/A$, may be 5.0 to 30.0. A ratio $B_1/A$ of 5.0 or more, promotes charging uniformity. A ratio $B_1/A$ of 30.0 or less, improves the coating property of a coating liquid for forming the conductive resin layer and suppresses particle loss. The ratio $B_1/A$ may be 7.5 to 20.0 in some examples, or 8.0 to 12.5 in other examples.

In some examples, the content of the resin particles is 5 to 80 parts by mass relative to 100 parts by mass of a resin constituting the matrix material, i.e., 5 to 80 phr. A content of the resin particles of 5 phr or more improves the charging performance, and, a content of the resin particles of 80 phr or less, improves a control of particle precipitation after preparation into a coating material, which in turn suppresses deterioration of the coating material stability (e.g., the coating material stability is improved). Accordingly, the content of the resin particles may be 10 to 70 phr. A content ratio between the first particle and the second particle in resin particles may be 5:1 to 1:5 in some examples, or 3:1 to 1:3 in other examples, in order to improve the charging performance. A content of the particles contained in the conductive resin layer may be quantified as follows. For example, the conductive resin layer is sampled from a charging member, and, by measuring a weight change resulting from heating the sample (TG), differential heat (DTA), calorie (DSC), and mass of volatile components (MS), a content of the particles may be quantified (TG-DTA-MS, DSC (thermal analysis)).

The base polymer may include various conductive agents (for example, conductive carbon, graphite, copper, aluminum, nickel, iron powder, conductive tin oxide, conductive titanium oxide, ion conducting agent, and/or the like), a charging control agent, and/or the like.

In some examples, an arithmetic average roughness Ra of a surface of the conductive resin layer may be 2.0 to 7.0 μm. An arithmetic average roughness of 2.0 μm or more, may improve the charging uniformity, and an arithmetic average roughness of 7.0 μm or less, may suppress contamination of a charging member surface as caused by a toner, an externally added agent, or the like. Accordingly, the arithmetic average roughness Ra may be 2.5 μm to 7.0 μm in some examples, or 2.5 to 5.0 μm, in other examples.

In some examples, an 10-point average roughness Rzjis of a surface of the conductive resin layer may be 15 to 40 μm.

In some examples, the 10-point average roughness is 15 μm or more, to obtain an improved charging performance, and 40 μm or less, to stabilize a coating material. Accordingly, the 10-point average roughness may be 20 to 35 μm in some examples, and 25 to 35 μm in other examples.

The skewness Rsk of a surface is a parameter that may use the cube of the root mean square height (Zq) to represent a dimensionless cubic mean of Z(x) in a standard or sample length. In some examples, the surface of the conductive resin layer has a skewness Rsk of 0.5 to 2.5, to improve the uniformity of discharge characteristics, when discharging onto the photosensitive body. When the skewness is 0.5 or more, the charging uniformity may be more easily obtained. When the skewness is 2.5 or less, the V0 concentration deviation may be reduced. Accordingly, the skewness of the surface of the conductive resin layer is 0.8 to 2.0 in some examples, or 0.8 to 1.5 in other examples.

The arithmetic average roughness, 10-point average roughness, and skewness of a surface of the conductive resin layer can be measured on the basis of JIS B0601-2001 by using roughness measuring device SE-3400, which is manufactured by Kosaka Laboratory Ltd. Furthermore, the surface properties of the conductive resin layer including those characteristics can be adjusted by modifying the size, amount, or the like of particles to be added to the conductive resin layer.

Examples of the charging member can maintain, even in a case in which direct current voltage exclusively, is applied thereto, charging uniformity that is stable over a long period time and dot uniformity. The bias voltage applied during image output for the life time of a photosensitive body may be −1000 to −1500 V, in order to more easily maintain the charging performance under various environments and control image concentration or various conditions. For example, a bias voltage is lower than −1500 V, it may be more difficult to optimize the development conditions for forming an image. In addition, if the bias voltage is higher than −1000 V, excessive discharging may occur more easily in the particle part of the conductive resin layer which may result, after forming an image, in a white point state of the image.

Method for Producing Charging Member

The example charging member illustrated in FIG. 1 may be produced as follows, as an example. Materials for a conductive elastic body layer are kneaded by using a kneader to prepare a material for a conductive elastic body layer. The material for the conductive elastic body layer is kneaded by using a kneader roller, and, a coating liquid for conductive resin layer is prepared according to mixing and stirring after addition of an organic solvent to a resulting mixture. In a mold for injection molding in which a core metal to become a conductive support is set, the material for conductive elastic body layer is filled and thermal cross-linking is carried out at predetermined conditions. According to demolding, a base roller having the conductive elastic body layer formed along the outer peripheral surface of the conductive support is prepared. On the outer peripheral surface of the base roller, the coating liquid for conductive resin layer is coated to form a conductive resin layer. Accordingly, it is possible to produce a charging member by forming a conductive elastic body layer on the outer peripheral surface of a conductive support and forming a conductive resin layer on the outer peripheral surface of a conductive elastic body layer.

Examples of the method for forming a conductive elastic body layer are not limited to injection molding methods, and may be carried out with a cast molding method, or a method combining press molding and abrasion. Examples of the method for coating the coating liquid for conductive resin layer may include a dipping method, a spray coating method, a roller coating method, or the like.

EXAMPLES

Additional examples will be described.

Example 1

Preparation of Material for Forming Conductive Elastic Body Layer

In this example, 100.00 parts by mass of epichlorohydrin rubber ("Epichlomer CG-102" manufactured by DAISO) as a rubber component, 5.00 parts by mass of sorbitan fatty acid ester ("Splender R-300" manufactured by Kao Corporation) as a lubricating agent, 5.00 parts by mass of ricinoleic acid as a softening agent, 0.50 part by mass of hydrotalcite compound ("DHT-4A" manufactured by Kyowa Chemical Industry Co., Ltd.) as an acid accepting agent, 1.00 part by mass of tetrabutyl ammonium chloride (ion conducting agent) ("Tetrabutyl ammonium chloride" manufactured by Tokyo Kasei Kogyo Co., Ltd.) as a conducting agent, 50.00 parts by mass of silica ("Nipsil ER" manufactured by Tosoh Silica Corporation) as a filler, 5.00 parts by mass of zinc oxide, 1.50 parts by mass of dibenzothiazole sulfide, and 0.50 part by mass of tetramethyl thiuram monosulfide as a cross-linking promoting agent, and 1.05 parts by mass of sulfur as a cross-linking agent were blended followed by kneading using a roller to prepare a material for forming a conductive elastic body layer (material for forming a rubber elastic part).

Preparation of Coating Liquid for Forming Conductive Resin Layer

To prepare the coating liquid for forming the conductive resin layer, 100.00 parts by mass of thermoplastic N-methoxymethylated 6-nylon ("Toresin F-30K" manufactured by Nagase ChemteX Corporation) as a polymer component, 5.00 parts by mass of methylene bisethylmethylaniline ("Curehard-MED" manufactured by Ihara Chemical Industry Co., Ltd.) as a curing agent, and 18.00 parts by mass carbon black (electron conducting agent) ("Denka Black HS100" manufactured by Denka Co., Ltd.) as a conducting agent were admixed in THF (tetrahydrofuran). To the mixture solution, two types of the amorphous nylon resin particles ("Orgasol Series" manufactured by Arkema) having different average particle diameter were further added, in the amount shown in Table 1A,1B, as resin particles, and stirred to have an uniform solution. Each component in the solution was dispersed using rollers. Accordingly, a coating liquid for forming a conductive resin layer was prepared.

The average particle diameter of the resin particles was measured as follows. Based on SEM observation, one hundred particles were extracted arbitrarily from a population of particles and the average value of particle diameter of those particles was used as an average particle diameter. Furthermore, because the particle shape of the resin particles which have been used was amorphous, the average value of the longest diameter and the shortest diameter of the observed particles was used as a particle diameter of an individual particle.

Production of Charging Member

A mold for roller molding having a cylinder-shaped roller molding space was prepared, and a core metal with a diameter of 6 mm was set therein such that it has the same axis as the roller molding space. The material for forming a conductive elastic body layer, prepared as described above, was injected into the roller molding space having the core metal set therein. After heating for 30 minutes at 170° C., it was cooled and demolded. A conductive elastic body layer having thickness of 3 mm formed along the outer peripheral surface of a core material as a conductive axial body was obtained.

According to an example roller coating method, the coating liquid for forming a conductive resin layer, prepared as described above, was coated onto a surface of the conductive elastic body layer of the roller body. Unnecessary coating liquid was removed using a scraper to a selected film thickness. After forming a coating film, it was heated for 30 minutes at 150° C. to form a conductive resin layer with thickness of 4.0 µm. Accordingly, a charging member having the axial body (conductive support), the conductive elastic body layer formed along the outer peripheral surface of the axial body, and the conductive resin layer formed along the outer peripheral surface of the conductive elastic body layer was obtained.

Other Examples and Comparative Examples

A charging member was produced in a similar manner as Example 1 except that the layer thickness of the conductive resin layer, type and addition amount of particles that are added, or the like are modified and adjusted as shown in Table 1A,1B. Amorphous nylon resin particles ("Orgasol Series" manufactured by Arkema) were used as the resin particles for all.

Various Evaluations

The following evaluations were carried out for the obtained charging members. The evaluations are summarized in Table 1A,1B and Table 2. In Table 1A,1B, the particle addition amount [phr] indicates the addition amount (parts by mass) relative to 100 parts by mass of the matrix material (N-methoxymethylated 6-nylon).

a) Layer Thickness of Conductive Resin Layer

Layer thickness A of the conductive resin layer was measured by using a scanning type electron microscope (SEM) and by performing measurements at several sites with a magnification of 5000.

b) Surface Properties of Conductive Resin Layer

The inter-particle distance RSm, the arithmetic average roughness (Ra), the 10-point average roughness (Rzjis), and the skewness (Rsk) of a surface of the conductive resin layer were measured by a method based on JIS B0601-2001 and by using roughness measuring device SE-3400, manufactured by Kosaka Laboratory Ltd. with cut-off value of 0.8 mm, measurement speed of 0.5 mm/s, and measurement length of 8 mm. By using the measuring device, the measurement was made for 6 arbitrary sites on a surface of the conductive resin layer, and the average value of those 6 sites was used as each measurement value.

c) Evaluation of Image Forming Property

As an image forming device, Multixpress C8640ND manufactured by Samsung was used. The charging member which has been obtained as described above was set and the evaluation of an image forming property was carried out under the following conditions.

Printing environment: under environment with constant temperature and constant humidity (23° C./60% RH)

Printing conditions: common printing speed of 305 mm/sec and half-rate speed thereof, printing number (2 points of 180 kPV, 360 kPV), paper type (OfficePaperEC)

Load on end part of conductive support: 5.88 N on single side

Applied bias: determined by brief adjustment to have potential of −600 V on a surface of a photosensitive body.

c-1) Evaluation of Microjitter

By using the above image forming device, a half-tone image was outputted. Microjitter shown in the image was apparent to the naked eye, and then evaluated based on the following criteria. The evaluation results are shown in Table 2. Furthermore, the microjitter is one of various indices for evaluating the charging uniformity. To determine whether or not it is possible to obtain a charging uniformity that is stable over a long period of time, observation of microjitter was carried out at initial stage of image forming (initial stage) and after durability test (after run).

Evaluation A: Uniform half-tone image was obtained.

Evaluation B: Slight charging non-uniformity has occurred on an end part of an image.

Evaluation C: Clear charging non-uniformity has occurred on an end part of an image.

Evaluation D: Charging non-uniformity has occurred on an entire surface of an image.

c-2) Evaluation of Dot Uniformity

Figure 3A:
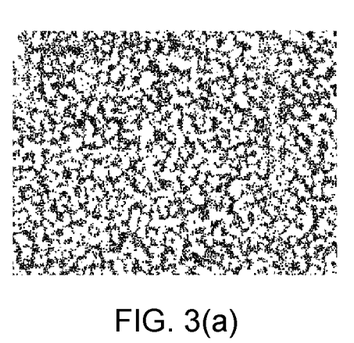
FIG. 3(a) is an image of a V0 concentration deviation on a photosensitive body operated with an example charging member.
Figure 3B:
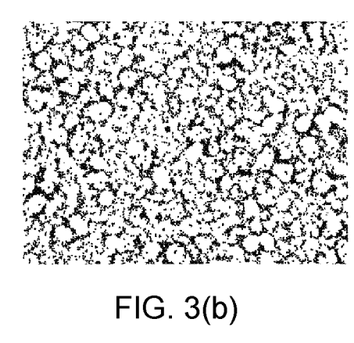
FIG. 3(b) is an image of a V0 concentration deviation on a photosensitive body operated with an example charging member.
Figure 3C:
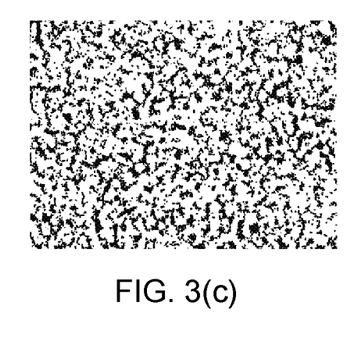
FIG. 3(c) is an image of a V0 concentration deviation on a photosensitive body operated with an example charging member.

First, in a state in which the surface potential on a photosensitive body is −600 V, development bias was adjusted such that the cloudy image concentration is OD=0.3 on a paper or for tape transfer. The cloudy image on a photosensitive body was obtained by a 200-magnification microscope (1024×768 pixels), and the image was converted to an binarized image (8 bit) in which the toner particles are black and the background (photosensitive body) is white (because of 8 bit, binarization in which black=0, and white=255 is obtained). The obtained binarized image was divided into a tile shape having one side of 44.4 µm (32 pixels) (32×24 division), average concentration of each tile was obtained, and then a deviation from the concentration was calculated. The evaluations results are shown in Table 2. Smaller V0 concentration deviation represents improved dot uniformity. FIG. 3(a) is an image of V0 concentration deviation visualized on a photosensitive body in Example 1, FIG. 3(b) is an image of V0 concentration deviation visualized on a photosensitive body in Example 8, and FIG. 3(c) is an image of V0 concentration deviation visualized on a photosensitive body in Example 19.

TABLE 1A (part 1 of 2)

| | Layer thickness A [µm] of conductive resin layer | First particle | | |
|---|---|---|---|---|
| | | Particle diameter $B_1$ [µm] | Content [phr] | $B_1/A$ |
| Example 1 | 4.0 | 20 | 35 | 5.0 |
| Example 2 | 3.0 | 30 | 25 | 10.0 |
| Example 3 | 2.0 | 40 | 15 | 20.0 |
| Example 4 | 1.0 | 30 | 25 | 30.0 |
| Example 5 | 5.0 | 30 | 25 | 6.0 |
| Example 6 | 1.5 | 30 | 25 | 20.0 |
| Example 7 | 4.0 | 30 | 25 | 7.5 |
| Example 8 | 3.0 | 35 | 20 | 11.7 |
| Example 9 | 4.0 | 20 | 35 | 5.0 |
| Example 10 | 5.0 | 30 | 25 | 6.0 |
| Example 11 | 4.0 | 30 | 10 | 7.5 |
| Example 12 | 2.0 | 30 | 25 | 15.0 |
| Example 13 | 2.0 | 40 | 20 | 20.0 |
| Example 14 | 1.0 | 30 | 20 | 30.0 |
| Example 15 | 5.0 | 30 | 20 | 6.0 |
| Example 16 | 2.0 | 40 | 10 | 20.0 |
| Example 17 | 7.0 | 35 | 20 | 5.0 |
| Example 18 | 3.0 | 30 | 15 | 10.0 |
| Example 19 | 1.0 | 20 | 10 | 20.0 |
| Example 20 | 2.0 | 40 | 5 | 20.0 |

TABLE 1A-continued (part 1 of 2)

|  | Layer thickness A [μm] of conductive resin layer | First particle | | |
|---|---|---|---|---|
|  |  | Particle diameter $B_1$ [μm] | Content [phr] | $B_1/A$ |
| Comparative Example 1 | 10.0 | 10 | 5 | 1.0 |
| Comparative Example 2 | 1.0 | 40 | 25 | 40.0 |

TABLE 1B (part 2 of 2)

|  | Second particle | | Total amount | |
|---|---|---|---|---|
|  | Particle diameter $B_2$ [μm] | Content [phr] | [phr] of first particle and second particle | $B_1 - B_2$ [μm] |
| Example 1 | 5.0 | 35 | 70 | 15 |
| Example 2 | 5.0 | 45 | 70 | 25 |
| Example 3 | 5.0 | 55 | 70 | 35 |
| Example 4 | 5.0 | 45 | 70 | 25 |
| Example 5 | 5.0 | 35 | 60 | 25 |
| Example 6 | 5.0 | 35 | 60 | 25 |
| Example 7 | 5.0 | 30 | 55 | 25 |
| Example 8 | 5.0 | 35 | 55 | 30 |
| Example 9 | 10.0 | 25 | 60 | 10 |
| Example 10 | 10.0 | 25 | 50 | 20 |
| Example 11 | 10.0 | 25 | 35 | 20 |
| Example 12 | 10.0 | 25 | 50 | 20 |
| Example 13 | 10.0 | 30 | 50 | 30 |
| Example 14 | 10.0 | 20 | 40 | 20 |
| Example 15 | 10.0 | 20 | 40 | 20 |
| Example 16 | 10.0 | 25 | 35 | 30 |
| Example 17 | 20.0 | 25 | 45 | 15 |
| Example 18 | 20.0 | 20 | 35 | 10 |
| Example 19 | 5.0 | 10 | 20 | 15 |
| Example 20 | 20.0 | 5 | 10 | 20 |
| Comparative Example 1 | — | — | 5 | — |
| Comparative Example 2 | 5.0 | 5 | 30 | 35 |

TABLE 2

|  | Ra [μm] | Rzjis [μm] | Rsk | RSm [μm] | Charging uniformity Microjitter | | Dot uniformity V0 concentration deviation |
|---|---|---|---|---|---|---|---|
|  |  |  |  |  | Initial stage | After run |  |
| Example 1 | 2.2 | 20 | 0.5 | 50 | A | C | 25.0 |
| Example 2 | 3.5 | 24 | 0.8 | 60 | A | C | 27.2 |
| Example 3 | 7.0 | 34 | 0.7 | 50 | A | B | 32.1 |
| Example 4 | 6.8 | 35 | 0.8 | 60 | A | B | 32.4 |
| Example 5 | 3.0 | 23 | 1.0 | 80 | A | B | 26.3 |
| Example 6 | 4.0 | 26 | 0.9 | 70 | A | B | 27.8 |
| Example 7 | 3.3 | 23 | 1.1 | 100 | A | A | 26.7 |
| Example 8 | 3.9 | 26 | 1.1 | 110 | A | A | 27.8 |
| Example 9 | 2.4 | 21 | 1.3 | 150 | A | B | 25.4 |
| Example 10 | 3.0 | 23 | 1.2 | 140 | A | B | 26.3 |
| Example 11 | 3.3 | 23 | 1.3 | 150 | A | A | 26.7 |
| Example 12 | 3.1 | 23 | 1.2 | 160 | A | A | 26.5 |
| Example 13 | 7.0 | 40 | 1.7 | 150 | A | B | 35.0 |
| Example 14 | 4.1 | 26 | 1.5 | 150 | A | B | 28.1 |
| Example 15 | 3.0 | 23 | 1.5 | 200 | A | B | 26.3 |
| Example 16 | 6.6 | 34 | 1.8 | 210 | A | B | 32.1 |
| Example 17 | 3.8 | 25 | 2.3 | 230 | A | C | 27.6 |
| Example 18 | 3.5 | 24 | 2.4 | 240 | A | C | 27.2 |
| Example 19 | 2.0 | 15 | 2.4 | 240 | A | C | 22.5 |
| Example 20 | 7.0 | 34 | 2.5 | 250 | B | C | 32.1 |
| Comparative Example 1 | 1.7 | 15 | -0.5 | 20 | D | D | 22.5 |
| Comparative Example 2 | 10.6 | 47 | 3.0 | 300 | B | C | 38.4 |

Examples of the image forming device provided with the charging member of the examples described herein may exhibit charging uniformity that is more stable over a longer period of time and may provide improved dot uniformity even when it is applied with direct current voltage exclusively.

It is to be understood that not all aspects, advantages and features described herein may necessarily be achieved by, or included in, any one particular example. Indeed, having described and illustrated various examples herein, it should be apparent that other examples may be modified in arrangement and detail.

The invention claimed is:

1. A charging member comprising:
   a conductive support;
   a conductive elastic body layer laminated on the conductive support; and
   a conductive resin layer laminated as an outermost layer on the conductive elastic body layer,
      wherein the conductive resin layer contains a matrix material and resin particles, and
      wherein the conductive resin layer has an arithmetic average roughness Ra of 2.0 to 7.0 μm, a 10-point average roughness Rzjis of 15 to 40 μm, and a skewness Rsk of 0.5 to 2.5.

2. The charging member according to claim 1, wherein the resin particles contain a first particle associated with a first average particle diameter B1 and a second particle associated with a second average particle diameter B2, and the first average particle diameter B1 is 20 to 40 μm, and wherein a difference B1−B2 between the first average particle diameter B1 and the second average particle diameter B2 is equal to or more than 10 μm.

3. The charging member according to claim 1, wherein the conductive resin layer includes a part formed exclusively of the matrix material having a layer thickness A of 1.0 to 7.0 μm.

4. The charging member according to claim 1, wherein the resin particles in the conductive resin layer have an interparticle distance RSm of 50 to 250 μm.

5. The charging member according to claim 1, wherein an arithmetic average roughness Ra of the conductive resin layer is 2.5 μm or more but less than 7.0 μm.

6. The charging member according to claim 1, wherein the conductive resin layer has a 10-point average roughness Rzjis of 20 to 35 μm.

7. The charging member according to claim 1, wherein the conductive resin layer has a skewness Rsk of 0.8 to 2.0.

8. The charging member according to claim 1, wherein the resin particles are insulating particles.

9. The charging member according to claim 1, wherein a content of the resin particles is 5 to 80 parts by mass relative to 100 parts by mass of the matrix material.

10. The charging member according to claim 1, wherein the resin particles include amorphous particles.

11. The charging member according to claim 1, wherein the resin particles include nylon resin particles.

12. The charging member according to claim 1, wherein the matrix material contains at least one resin selected from the group consisting of a nylon resin and a polyurethane resin.

13. The charging member according to claim 1, wherein the conductive elastic body layer contains epichlorohydrin rubber.

14. The charging member according to claim 1, wherein the charging member is subjected to direct current voltage exclusively.

15. An image forming device comprising:
a photosensitive body having a surface to be charged; and
a charging member to charge the surface of the photosensitive body, wherein the charging member includes:
a conductive support;
a conductive elastic body layer laminated on the conductive support; and
a conductive resin layer laminated as an outermost layer on the conductive elastic body layer, wherein the conductive resin layer contains a matrix material and resin particles, and wherein the conductive resin layer has an arithmetic average roughness Ra of 2.0 to 7.0 µm, a 10-point average roughness Rzjis of 15 to 40 µm, and a skewness Rsk of 0.5 to 2.5.

* * * * *